United States Patent
Muukki et al.

(10) Patent No.: US 7,990,992 B2
(45) Date of Patent: Aug. 2, 2011

(54) ELECTRONICALLY CONFIGURABLE INTERFACE

(75) Inventors: Mikko Juhana Muukki, Tampere (FI); Mikko Antti Ollila, Tampere (FI); Juha Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 139 days.

(21) Appl. No.: 12/214,783

(22) Filed: Jun. 19, 2008

(65) Prior Publication Data

US 2009/0316724 A1 Dec. 24, 2009

(51) Int. Cl.
*H04M 1/00* (2006.01)
(52) U.S. Cl. ..................... 370/419; 455/556.1
(58) Field of Classification Search ............... 370/419, 370/469
See application file for complete search history.

(56) References Cited

U.S. PATENT DOCUMENTS

| | | | | |
|---|---|---|---|---|
| 6,400,903 B1* | 6/2002 | Conoval | .......... | 396/56 |
| 6,535,522 B1* | 3/2003 | Arato et al. | .......... | 370/466 |
| 2003/0100308 A1* | 5/2003 | Rusch | .......... | 455/445 |
| 2005/0028214 A1* | 2/2005 | Hall | .......... | 725/105 |
| 2005/0030801 A1* | 2/2005 | Perroni et al. | .......... | 365/200 |
| 2007/0120962 A1* | 5/2007 | Cheng | .......... | 348/14.02 |
| 2007/0254640 A1* | 11/2007 | Bliss | .......... | 455/420 |
| 2007/0283046 A1* | 12/2007 | Dietrich et al. | .......... | 709/245 |
| 2008/0250469 A1* | 10/2008 | Agnoli et al. | .......... | 725/118 |
| 2008/0298793 A1* | 12/2008 | Clark | .......... | 396/57 |
| 2009/0177808 A1* | 7/2009 | Park et al. | .......... | 710/19 |
| 2009/0315899 A1* | 12/2009 | Pourbigharaz et al. | .......... | 345/501 |

OTHER PUBLICATIONS

"MIPI Alliance Specification for D-PHY" Version 0.90.00—Oct. 8, 2007, pp. 1-131.
"MIPI Alliance Standard for Camera Serial Interface 2 (CSI-2)" Version 1.00—Nov. 29, 2005, pp. 1-124.
"SMIA 1.0 Part 2: CCP2 Specification" 2004, pp. 1-74.

* cited by examiner

*Primary Examiner* — Min Jung

(57) ABSTRACT

A physical interface that is electronically configurable to transfer information according to any protocol of a pre-defined set of at least two protocols is disclosed. Moreover, electronic configuration of such a physical interface to transfer information according to any protocol of a pre-defined set of at least two protocols is disclosed.

38 Claims, 10 Drawing Sheets

ELECTRONICALLY CONFIGURABLE INTERFACE

FIELD

The invention relates to the field of interfacing.

BACKGROUND

The proportion of mobile devices, in particular of wireless devices like mobile phones and personal digital assistants (PDA), with an in-built camera is steadily increasing. Rapid technological advances in electronics make these devices endowed with camera modules ever more affordable. At the same time, the capabilities of these cameras are also becoming better at such a pace that their image quality has often become almost indistinguishable from that of dedicated digital cameras in terms of resolution, color depth and light sensitivity. Of course all these observations apply equally to still pictures, like digital photographs, as well as to the moving pictures of a digital movie. The inclusion of a camera module into a mobile device does not only have implications for the user of the mobile device, but also for the manufacturing and sourcing process of the device. For example, every user of a mobile device like a mobile phone is aware of connectivity questions for different accessories for that device. Different devices may or may not be compatible with various headsets, chargers or connectors to stationary devices like personal computers. Comprehensive interoperability is always desired but not very often achieved. But the question of interoperability is not only relevant with regard to connecting the mobile device to external components and other devices, but also arises for connecting the constituent components of the mobile device themselves. To with, the camera module of a mobile device needs to transfer the image data to a processor of that device, for instance a baseband processor of that device, for the image taken by the camera module to be further displayed to the user, to be transmitted to another device, to be stored, or for any further processing. This data transfer may occur over various kinds of physical lines and using any of a variety of higher protocol layers. This data transfer protocol may also be different for different camera modules transmitting the image data and for different processors, e.g. baseband processors, receiving the image data. This restricts the ability of mobile device manufacturers to combine camera modules with different processors, including baseband processors, and corresponding chipsets and either necessitates a larger inventory and more complicated sourcing or the use of interoperability hardware, like conversion circuits, thus adding to product cost, weight and space requirements.

SUMMARY OF SOME EXEMPLARY EMBODIMENTS OF THE INVENTION

According to a first aspect of the present invention, an apparatus is disclosed which comprises a physical interface. The physical interface is electronically configurable to transfer information according to any protocol of a pre-defined set of at least two protocols.

According to the first aspect of the present invention, further a camera module is disclosed comprising a physical interface and a camera. The physical interface is electronically configurable to transfer information according to any protocol of a pre-defined set of at least two protocols. The camera is configured to generate the information.

According to the first aspect of the present invention, further a method is disclosed comprising transferring information via an electronically configurable physical interface. The information may be transferred according to any protocol of a pre-defined set of at least two protocols.

According to the first aspect of the present invention, further a program is disclosed, comprising program code for performing the method according to the first aspect of the present invention, when said program is executed on a processor. Said program may for instance be distributed via a network, such as for instance the Internet. Said program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the first aspect of the present invention, further a readable storage medium encoded with instructions that, when executed by a processor, perform the method according to the first aspect of the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to the first aspect of the present invention, further a program is disclosed which causes a processor to transfer information via an electronically configurable physical interface. The information may be transferred according to any protocol of a pre-defined set of at least two protocols. Said program may for instance be stored on a readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the first aspect of the present invention, further an apparatus is disclosed comprising means for transferring information via an electronically configurable physical interface according to any protocol of a pre-defined set of at least two protocols. The apparatus may further comprise means for detecting. The apparatus may further comprise means for generating the information.

According to an exemplary embodiment of the first aspect of the present invention, the physical interface is an arrangement comprising at least one conductive signal line configured to carry electrical or electronic signals. The physical interface may comprise any number of such conductive signal lines. The physical interface may be the point of contact between the apparatus according to the present invention and another apparatus and/or the point where electrical signals from one may be transferred to the other or vice versa.

In an exemplary embodiment of the first aspect of the present invention, the physical interface is electronically configurable in the sense that some of its characteristics, like the actual conductive lines used, the timing, the signal amplitude, the coding and order of the signal data, may be determined by an electronic input to the apparatus. The electronic input may comprise an applied voltage level, it may comprise a particular signal sequence or it may comprise access by an electronic communication protocol. The information to be transferred may comprise any digital or analog information in the form of electrical signals. The digital information to be transferred may be encoded or compressed.

According to an exemplary embodiment of the first aspect of the present invention, before, during or after the transfer of information, the physical interface is configured to transfer information according to a particular protocol from the pre-defined set of protocols. The particular protocol for transfer may be selected by electronic configuration. The protocol according to which information is transferred over the physical interface may be further electronically configured.

In an exemplary embodiment of the first aspect of the present invention, the transfer of information is a unidirectional transmission or reception of information.

The transfer of information may also be a full duplex communication or a half duplex communication.

According to an exemplary embodiment of the first aspect of the present invention, a protocol is a communication protocol. A protocol may specify a set of rules for data representation, signaling and error detection when sending information over a communications channel. A protocol may specify rules for all protocol layers or it may only specify rules for a single protocol layer. In particular, a protocol may specify rules for the physical layer. The physical layer may define all the electrical and physical specifications for the transfer of information. In particular the physical layer may define the timing, the amplitude and duration of electrical or electronic signals. It may define electrical properties like resistance and capacitance and mechanical properties like width and length of signal lines.

In an exemplary embodiment of the first aspect of the present invention, a camera is a visual sensor for generating information corresponding to visual data. The visual data may be visual data for a single image, i.e. a photographic image. The visual data may also be visual data for a succession of images, i.e. a movie. A camera module may generate and supply visual information to the device of which it is a module. A camera module may be the module of an electronic device. For example, it may be the module of a mobile electronic device like a mobile phone, a personal digital assistant or a portable music player.

In an exemplary embodiment of the first aspect of the present invention, the at least two protocols of the pre-defined set of at least two protocols are serial protocols. This has the advantage that a smaller number of signal lines may be required for transferring the information. Thus especially when the signal lines need to span a larger distance significant wiring is saved.

A serial protocol may be understood as a communication protocol where the information for each bit is transmitted sequentially over a communication channel. The channel may comprise a single line. The channel for a differential signal may also comprise two lines. A clock signal or a timing signal may be transmitted simultaneously and in parallel. The basic unit of transfer may be given by any number of bytes. The bits of this number of bytes may be serialized for transmission. The serialized bits may be transferred sequentially, one bit at a time, over the communication channel. In contrast, in a parallel protocol the bits of a number of bytes forming the basic unit of transmission are transferred over different signal lines. In particular, according to a parallel protocol some or all bits of a number of bytes forming the basic unit of transmission may in addition be transferred simultaneously over different signal lines.

In an exemplary embodiment of the first aspect of the present invention, a serial protocol comprises one or more individual serial protocols operated in parallel. A clock signal or a timing signal may simultaneously be used for one or more individual serial protocols operated in parallel. When operated in parallel, the bits of the number of bytes serialized for transmission may all be sequentially transmitted over the same channel for each serialized number of bytes. Thus all bits of a number of bytes serialized for transmission may be transmitted over the same channel.

In an exemplary embodiment of the first aspect of the present invention, a first serial protocol of the pre-defined set of at least two protocols is the camera serial interface 2 (CSI-2) as specified in the document "MIPI Alliance Standard for Camera Serial Interface 2 (CSI-2)", Version 1.00—29 Nov. 2005. A second serial protocol of the pre-defined set of at least two protocols may be the compact camera port (CCP). The CCP may comprise the compact camera port 1 protocol (CCP1). The CCP may also comprise the compact camera port 2 protocol (CCP2). Any protocol of the pre-defined set of at least two protocols may comprise all speed classes for that protocol.

In an exemplary embodiment of the first aspect of the present invention, the interface is configurable via a serial computer bus. A computer bus may be a subsystem that transfers data between electronic components. In a serial computer bus data bits may be sent one bit at a time and thus sequentially. The serial computer bus may be a bus according to the inter-integrated circuit protocol (I2C) as specified in document UM 10204 "I2C-bus specification and user manual Rev. 03—19 Jun. 2007" published by NXP Semiconductors. The serial computer bus may also be a bus according to the serial low-power inter-chip media bus (SLIMBus) protocol. Information other than that for configuring the interface may be transmitted over the serial computer bus. Entities other than the interface may be connected to the serial computer bus. The serial computer bus may be a two wire interface (TWI) or a display data channel (DDC) as specified in VESA document VESA-2004-10. The interface being configurable via a serial computer bus has the advantage that the interface may be connected to a pre-existing and already implemented bus, thus saving additional protocol overhead and wiring.

In an exemplary embodiment of the first aspect of the present invention, the interface is configurable by a camera control interface (CCI). The camera control interface may be a protocol for controlling and configuring a camera module. This has the advantage that configuration of the interface may be provided by standardized signals. The camera control interface may be a high level general camera control bus protocol. The camera control interface may use I2C as underlying serial computer bus protocol. The camera control interface may use SLIMBus as underlying serial computer bus protocol.

In an exemplary embodiment of the first aspect of the present invention, the interface is configurable by software. A software code running on a processor may perform the steps for supplying the signals for configuration of the interface. The processor may be outside the apparatus comprising the interface. This has the advantage that the configuration of the interface may be implemented without a redesign of the hardware. Alternatively, the processor may be inside the apparatus comprising the interface. However, even in this latter case, the processor may be externally controlled to configure the interface.

In an exemplary embodiment of the first aspect of the present invention, the at least two protocols are configured to have a mutually interoperable physical layer protocol. The at least two protocols may each have an underlying physical layer protocol which does not disrupt the respective physical layer protocols of another of the at least two protocols. The at least two protocols may also be configured to share the same underlying physical layer protocol. The physical layer of the protocol may provide an electrical, mechanical and procedural interface to the transmission medium. It may define the timing, the frequency, the amplitude of the electrical signals as well as the number and physical characteristics like resistance and capacitance of the signal lines that conduct the electrical signals. The physical layer of the at least two protocols may be identical. It may be that one of the at least two protocols may have a higher number of instances of the physical protocol layer than another of the at least two protocols. This has the advantage that additional overhead for the implementation of an additional physical layer protocol may be avoided.

In an exemplary embodiment of the first aspect of the present invention, the at least two protocols are configured to at least partially use the same physical signal lines. The electrical signals of a first of the at least two protocols may be the physical signal lines of a second of the at least two protocols. The second of the at least two protocols may use the physical signal lines of a first of the at least two protocols and in addition other physical signal lines. This has the advantage that the total number of used physical signal lines is saved and that a connector used for a first of the at least two protocols may also be used by a second of the at least two protocols.

In an exemplary embodiment of the first aspect of the present invention, the at least two protocols are scalable protocols. A first of the at least two protocols may comprise a communication channel for the sequential transmission of the bits of a number of bytes forming the basic unit of transmission. A second of the at least two protocols may comprise two instances of the communication channel of the first of the at least two protocols. All bits of each number of bytes forming the basic unit of transmission may either be transmitted over the first instance of the communication channel or they may be transmitted over the second instance of the communication channel. This has the advantage that the bandwidth may be increased by an integral factor in a simple way without incurring additional protocol overhead.

In an exemplary embodiment of the first aspect of the present invention, the physical layer of at least one of the at least two protocols comprises a scalable number of physical differential signal lines. A first of the at least two protocols may use two or more lanes to create a connection. Each lane may comprise two complementary lane module communicating via two-line, point-to-point lane interconnects. Each lane interconnect may be used both for differential high-speed signaling and low-power signaling. A lane may be used for either data or clock signal transmission. Each connection may comprise a clock lane. Each connection may comprise one or more data lanes. A first of the at least two protocols may use a first set of two physical signal lines to transmit a first differential signal for a protocol. A second of the at least two protocols may further use a second set of two physical signal lines to transmit a second differential signal for a protocol. Thus the second of the at least two protocols may use two sets of two physical lines each to transmit two differential signals for a protocol. The second of the at least two protocols may correspond to the first protocol scaled by a factor of two. Each number of bytes forming a unit of transmission may be transmitted as a differential signal over either the first two physical signal lines or the second two physical signal lines. This has the advantage that the total number of needed physical signal lines is reduced.

In an exemplary embodiment of the first aspect of the present invention, the interface is operable in at least two states comprising a software standby state. In a software standby state, the interface may be supplied with voltage and the hardware of the interface may be fully powered up. However, the interface may not be actually engaged in data transfer via the protocol when it is in a software standby state. The interface may be operable in at least one other state, which may be an active state. The interface may be in an active state when the interface is actually engaged in data transfer via the protocol. This has the advantage that the hardware of the interface is powered up and the apparatus comprising the interface may engage in communications while the interface is not actually transmitting data yet.

In an exemplary embodiment of the first aspect of the present invention, the interface is electronically configurable while the interface is in a software standby state. In a software standby state, the hardware of the interface may be fully powered up and there may also be software running in the interface or in the apparatus comprising the interface. However, the interface may not be transferring data while it is in a software standby state. This has the advantage that the interface does not need to stop an ongoing transfer when being electronically configured and that the interface is ready for immediate transfer after the electronic configuration.

In an exemplary embodiment of the first aspect of the present invention, the interface is operable in at least four states comprising a power off state, a hardware standby state, a software standby state and an active state. In a power off state, the interface may not be supplied with power. The interface may not transfer data in a power off state and the interface may not be electronically configured in a power off state. In a hardware standby state, the interface may be supplied with power, but the interface may not be electronically configured and may not transfer data. In a hardware standby state software may not be running in the interface or in the apparatus comprising the interface. In a software standby state, the hardware of the interface may be fully powered up and there may also be software running in the interface or in the apparatus comprising the interface. However, the interface may not be transferring data while it is in a software standby state. In an active state the interface may be currently transferring data. The hardware and the software of the interface may be in full operation. The interface may not be electronically configured in an active state. This has the advantage that different operational levels associated with different functional and power consumption may be selected at different times thus saving power and maximizing flexibility.

In an exemplary embodiment of the first aspect of the invention, the interface is configurable by the same entity to which or from which the information is transferred. The physical interface may be configurable to transfer information to a baseband processor. The physical interface may be configurable by a baseband processor. The physical interface may be configurable by a baseband processor to transfer information to that baseband processor.

In an exemplary embodiment of the first aspect of the present invention, the apparatus comprising the interface further comprises a detector configured to generate the information. The detector may be any sensor which generates information based on a physical measurement. The physical measurement may comprise measuring acoustic signals, electronic signals, optical signals or other signals. This detector may generate analog or digital information. This has the advantage that the apparatus comprising the interface and the detector may be an integrated entity and may thus reduce the total area and volume requirement.

In an exemplary embodiment of the first aspect of the present invention, the detector is a camera. A camera may be a sensor that generates visual information based on measured optical signals. A camera may be a sensor that in addition generates audio information based on measured acoustic signals. The visual information may be analog or digital information. The visual information may be information for a still picture or for a sequence of pictures or for moving images. The information may comprise audio information which is synchronous to the moving images information. The visual information may also comprise color space information. Color space information may provide color information for each pixel by providing values for the color components of each individual pixel. This has the advantage that the visual information generated by the camera may be transferred via a flexibly configurable interface, thus allowing more devices to connect to the camera.

In an exemplary embodiment of the first aspect of the present invention, the apparatus is a camera module. A camera module may comprise a camera and may be configured for use in a device, for example a mobile electronic device, to provide camera functionality. The camera module may be electronically controllable and may comprise an interface for transfer of the picture data generated by the camera comprised by the camera module. The camera may generate visual information which may be analog or digital information. The visual information may be information for a still picture or for a sequence of pictures or for moving images. The visual information may also comprise color space information. This has the advantage that a camera module may be flexibly used within various devices with different baseband processors and the interface configured accordingly at runtime, thus reducing interoperability of electronic components and making sourcing and manufacturing easier.

In an exemplary embodiment of the first aspect of the present invention, the apparatus is a portable device that further comprises a user interface. The portable device may for instance be a mobile phone, a PDA, a digital camera or any other portable device.

According to a second aspect of the present invention, an apparatus is disclosed comprising a controller. The controller is configured to electronically configure a physical interface to transfer information according to any protocol of a pre-defined set of at least two protocols. The controller may be a baseband processor.

According to the second aspect of the present invention, further a method is disclosed comprising electronically configuring a physical interface to transfer information according to any protocol of a pre-defined set of at least two protocols.

According to the second aspect of the present invention, further a program is disclosed, comprising program code for performing the method according to the second aspect of the present invention, when said program is executed on a processor. Said program may for instance be distributed via a network, such as for instance the Internet. Said program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the second aspect of the present invention, further a readable storage medium encoded with instructions that, when executed by a processor, perform the method according to the second aspect of the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to the second aspect of the present invention, further a program is disclosed which causes a processor to electronically configure a physical interface to transfer information according to any protocol of a pre-defined set of at least two protocols. Said program may for instance be stored on a readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the second aspect of the present invention, further an apparatus is disclosed comprising means for electronically configuring a physical interface to transfer information according to any protocol of a pre-defined set of at least two protocols.

According to an exemplary embodiment of the second aspect of the present invention, the controller is implemented in hardware and/or software. It may comprise for instance a processor executing software program code for realizing the required functions. Alternatively, it could be for instance a circuit that is designed to realize the required functions, for instance implemented in a chipset or a chip, like an integrated circuit. The controller may concurrently execute other software program code as well.

According to an exemplary embodiment of the second aspect of the present invention, the processor may be external to an apparatus that comprises the interface. Equally well, said processor may be comprised in the apparatus that comprises the interface. In the latter case, the processor may be externally triggered to perform the configuring of the interface.

In an exemplary embodiment of the second aspect of the present invention, the at least two protocols of the pre-defined set of at least two protocols are serial protocols.

In an exemplary embodiment of the second aspect of the present invention, the interface is configurable via a serial computer bus.

In an exemplary embodiment of the second aspect of the present invention, the interface is configurable by a camera control interface (CCI).

In an exemplary embodiment of the second aspect of the present invention, the interface is configurable by software.

In an exemplary embodiment of the second aspect of the present invention, the at least two protocols are configured to have a mutually interoperable physical layer protocol.

In an exemplary embodiment of the second aspect of the present invention, the at least two protocols are configured to at least partially use the same physical signal lines.

In an exemplary embodiment of the second aspect of the present invention, the at least two protocols are scalable protocols.

In an exemplary embodiment of the second aspect of the present invention, the physical layer of at least one of the at least two protocols comprises a scalable number of physical differential signal lines.

In an exemplary embodiment of the second aspect of the present invention, the interface is operable in at least two states comprising a software standby state. In an exemplary embodiment of the second aspect of the present invention, the interface is electronically configurable while the interface is in a software standby state.

In an exemplary embodiment of the second aspect of the present invention, the interface is operable in at least four states comprising a power off state, a hardware standby state, a software standby state and an active state.

In an exemplary embodiment of the second aspect of the invention, the interface is configurable by the same entity to which or from which the information is transferred. The physical interface may be configurable to transfer information to a baseband processor. The physical interface may be configurable by a baseband processor. The physical interface may be configurable by a baseband processor to transfer information to that baseband processor.

In an exemplary embodiment of the second aspect of the present invention, the apparatus comprising the interface further comprises a detector configured to generate the information.

In an exemplary embodiment of the second aspect of the present invention, the detector is a camera.

In an exemplary embodiment of the second aspect of the present invention, the apparatus is a portable device that further comprises a user interface. The portable device may for instance be a mobile phone, a PDA, a digital camera or any other portable device.

It is to be understood that the description of the characteristics and advantages disclosed in the context of the first aspect of the present invention equally applies to the second aspect of the present invention.

Exemplary embodiments of both aspects of the present invention provide means for dynamically configuring the data transferred by a camera module to two or more different protocol standards, like for instance CCP and CSI-2. Since switching between different protocol standards is performed electronically (e.g. in software), for instance during use, the hardware architecture of a camera module with such an electronically configurable interface is not affected. The same physical pins of a camera module may then be used with multiple interface protocols, like CCP and CSI-2. When two different protocol standards are supported by the camera module, instead of having two separate (protocol-specific) camera modules for two different target architectures (of the device into which the camera module shall be integrated in), only one camera module is required. Thus, inter alia, sourcing is simplified by increasing the interoperability of camera modules with baseband processors.

The features of the present invention and of its exemplary embodiments as presented above are understood to be disclosed also in all possible combinations with each other.

Furthermore, it is to be understood that the above description of embodiments of the present invention is to be understood to be merely exemplary and non-limiting.

These and other aspects of the invention will be apparent from and elucidated with reference to the detailed description presented hereinafter.

DETAILED DESCRIPTION OF EXEMPLARY EMBODIMENTS OF THE INVENTION

In the following detailed description, exemplary embodiments of the present invention will be described in the context of an interface that connects a camera with a baseband processor. It is readily understood that the present invention is equally well applicable to various other interfaces.

Figure 1:
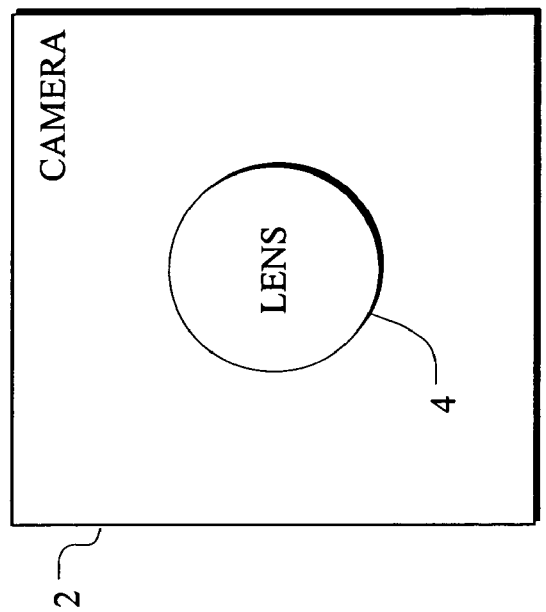
FIG. 1 is a schematic diagram illustrating an exemplary embodiment of a camera according to the present invention.

FIG. 1 illustrates an exemplary camera 2 according to the present invention. The camera 2 comprises an objective lens 4. The camera 2 may be configured for capturing still images, i.e. photographs. The camera 2 may also be configured for capturing moving images, i.e. video. The camera 2 may also be configured for recording sound simultaneously while capturing images. The camera 2 may comprise a camera module. The camera may comprise further functionality like wireless communication and video playback.

Figure 2:
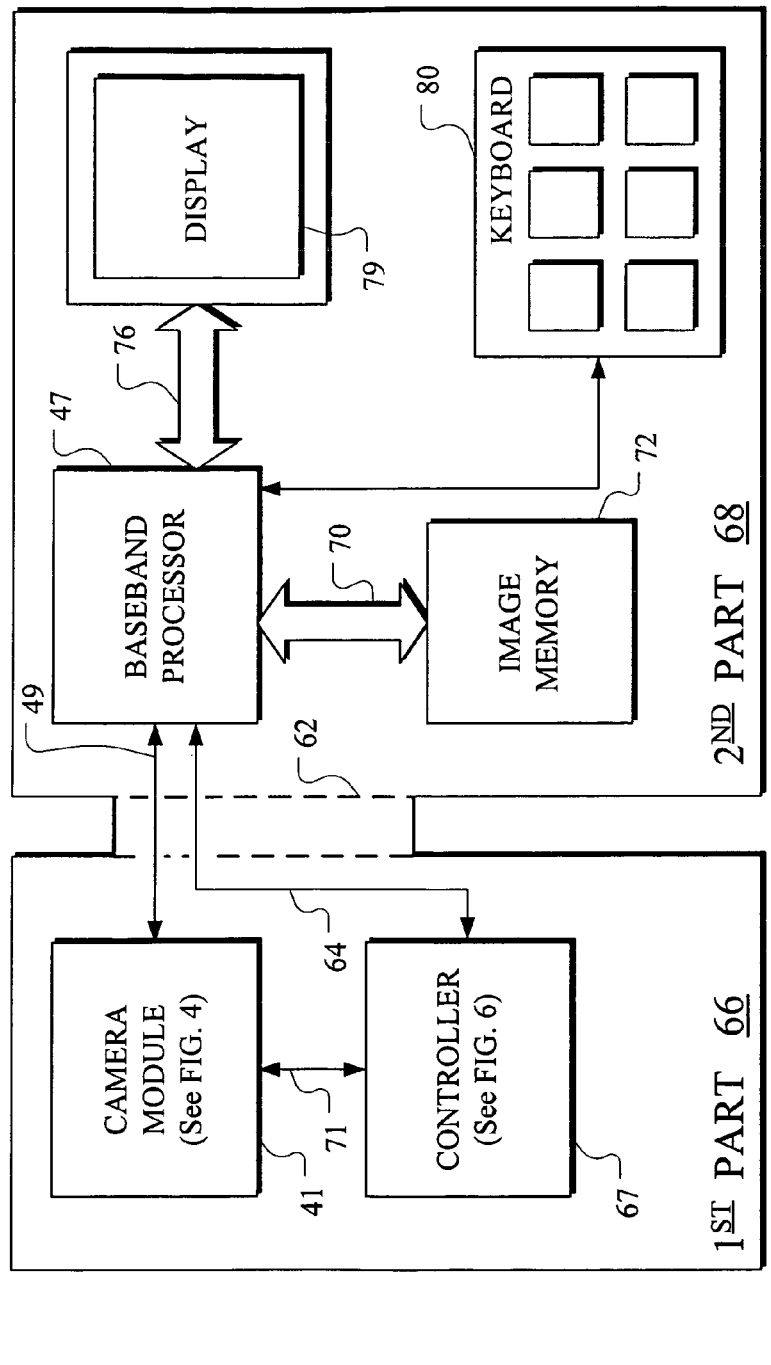
FIG. 2 is a schematic diagram illustrating an exemplary embodiment of a portable device according to the present invention.

FIG. 2 illustrates an exemplary portable device according to the present invention, in this case a mobile camera phone 78. The mobile camera phone 78 is a clam like mobile camera phone comprising a first part 66 and a second part 68. The first part 66 and the second part 68 are connected by a joint 62 of the mobile camera phone 78. In the first part 66, the mobile camera phone 78 comprises a camera module 41 (see FIG. 4 and below for the detailed description for FIG. 4) and a controller 67 (see FIG. 5). In the second part 68, the mobile camera phone comprises a baseband processor 47, a display 79, image memory 72 and as an exemplary user interface a keyboard 80. The controller 67 is connected to the camera module 41 via a CCI bus 71. The controller 67 is also connected to the baseband processor 47 via serial lines 64. The camera module 41 is connected to the baseband processor 47 via a set of physical lines 49. The set of physical lines 49 serially transmits data words. The baseband processor 47 is connected to the display 79 via a first parallel bus 76. The baseband processor 47 is connected to the image memory 72 via a second parallel bus 70. The baseband processor is further connected to the keyboard 80.

Because the set of physical lines 49 serially transmits data words and because the controller 67 is connected to the baseband processor 47 via serial lines 64, fewer wires need to be carried through the joint 62 than in the case for parallel transmission.

On startup of the mobile camera phone 78, the controller 67 may send a CCI signal via the CCI bus 71 to the camera module 41 requesting a switch to the CCP mode. The interface of the camera module 41 is subsequently switched to the CCP mode and all data transfer between the camera module 41 and the baseband processor 47 utilizes the CCP protocol.

A user presses a key of the keyboard 80 to activate the camera module 41. The camera module 41 continually captures image data and transfers it to the baseband processor 47 via the set of physical lines 49 according to the CCP protocol.

The baseband processor 47 transfers the image data to the display 79 via the first parallel bus 76, on which display the image data is displayed.

When the user agrees to the displayed image data, the user presses another key of the keyboard 80 to trigger saving the current image. The camera module 41 captures image data and transfers it to the baseband processor 47 via the set of physical lines 49 according to the CCP protocol. The baseband processor 47 transfers the image data to the image memory 72 via the second parallel bus 70. The image data is subsequently stored in the image memory 72.

The user presses a further key of the keyboard 80 to stop the image capture of the camera module 41. Subsequently the camera module 41 stops transferring image data to the baseband processor 47.

Figure 3:
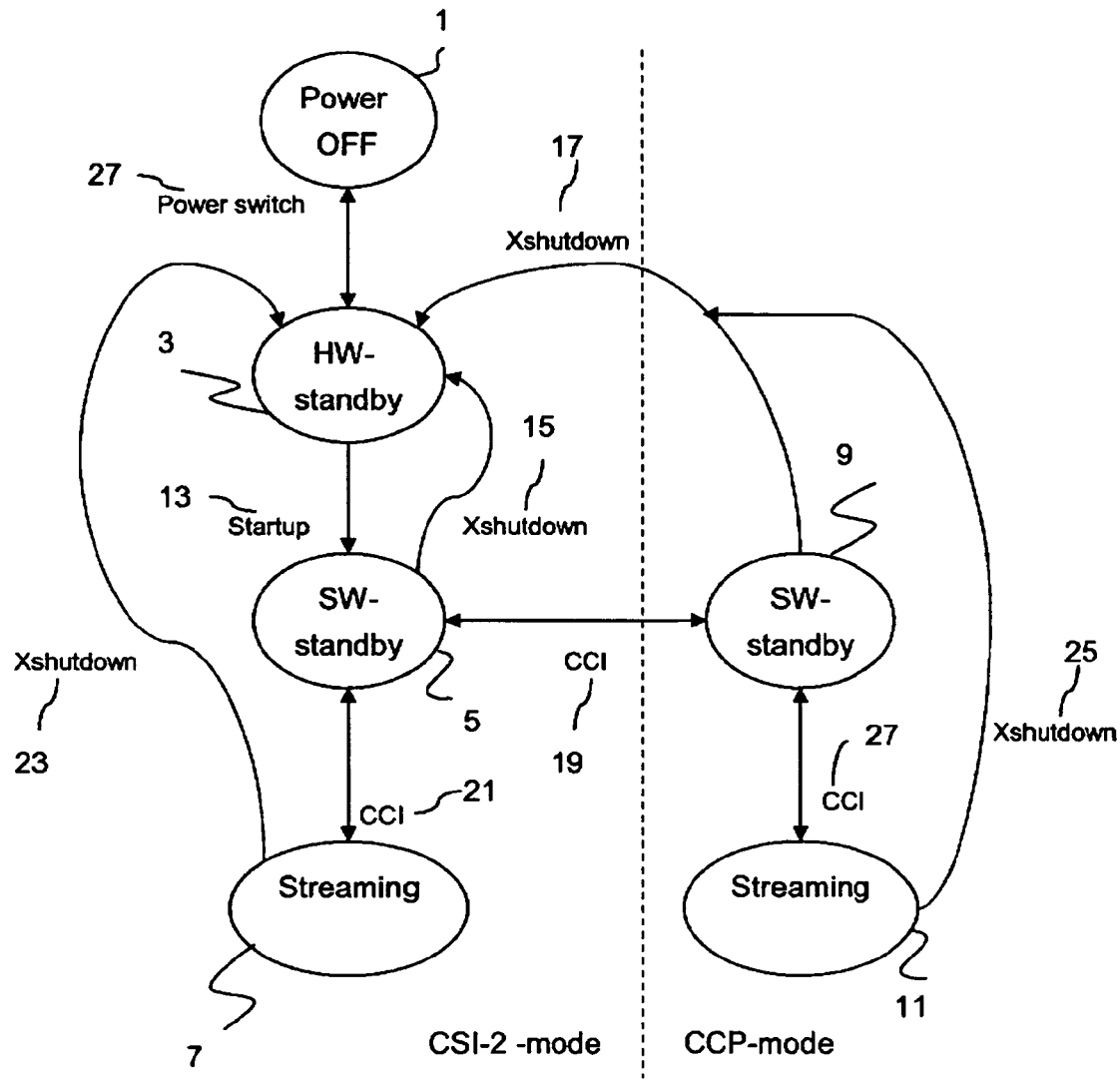
FIG. 3 is a diagram schematically illustrating the states in which an interface is operable according to an exemplary embodiment of the present invention.

FIG. 3 illustrates exemplary states in which an interface electronically configurable to transfer information according to any protocol of a pre-defined set of at least two protocols is operable.

The interface is operable in a power off state 1, a hardware (HW) standby state 3, a first software (SW) standby state 5, a second SW standby state 9, a first streaming state 7 and a second streaming state 11. A transition from one state to another state may occur as a result of a power switch signal 27, an external startup signal 13, an external shutdown signal 15, 17, 23, 25 or a camera control interface (CCI) signal 19, 21, 27.

When no external power supply is provided, the interface is in a power off state 1. The interface makes a state transition to a hardware standby state 3 when a power switch signal 27 is received, i.e. when electrical power is supplied. This happens when the power supply is turned on. The interface also makes a state transition from the hardware standby state 3 to the power off state 1 when a power switch signal 27 is received as a result of the power supply being removed or turned off again.

While in the hardware standby state 3, the interface is also in the camera serial interface 2 (CSI-2) mode. CSI-2 is an interface specification for data transfer between a camera module and another component, for example a baseband processor. CSI-2 specifies the transfer of data, for example the transfer of image data captured by the camera module, from the camera module to the baseband processor (see baseband processor 47, camera 45 and interface 43 in FIG. 4). The interface may make a state transition from the hardware standby state 3 to a first software standby state 5 upon receiving a startup signal 13. The startup signal 13 is an external signal causing operational software of the interface to be activated. Alternatively, the interface may also make a state transition from the hardware standby state 3 to a first software standby state 5 upon receiving a start up CCI command or when clock gating is disabled.

In the first software standby state 5, the interface is not actually transferring image data. However, the interface is able to receive external signals from a CCI bus including configuration signals. Thus, the interface is able to receive external signals at an early stage and also in a situation where there is no or reduced transfer of data. The interface can be changed as soon as possible as in the software standby state the interface can accept commands. In this phase the interface is not very active. If the receiver of the data transferred by the interface supports only a single protocol, then in this phase it needs to withstand both protocols without being damaged or creating damage. A CCI bus is a serial computer bus based on the inter-integrated circuit (I2C) bus. In the first software standby state 5 the interface is also in the CSI-2 mode. Moreover, in the first software standby state 5 the interface may make a state transition from the first software standby state 5 to the hardware standby state 3 by an external shutdown signal 15. The interface may also make a transition from the first software standby state 5 to the first streaming state 7 by a CCI signal 21 indicating that the data transfer should be started. This may be the case for example when a controller controlling the interface and a camera module causes the camera module to take a picture. The image data from the camera module is then transferred to the interface which further transfers the data, for example to a baseband processor. The interface may also make a transition to the second software standby state 9 by a CCI signal 19 configuring the interface to switch to the compact camera port (CCP) mode. The CCP is also an interface specification between a camera module and a baseband processor and specifies the transfer of data from the camera module to the baseband processor.

In the first streaming state 7 the interface is actively transferring information, for example to a baseband processor, according to the CSI-2 protocol. The CSI-2 protocol is a scalable serial protocol based on the D-PHY physical level protocol. The interface may make a state transition to the hardware standby state 3 by an external shutdown signal 23. It may also make a transition to the first software standby state 5 by a CCI signal 21 indicating that the transfer of information should be stopped. This may happen for example when the transfer of information comprising the image data to the baseband processor is complete.

In a second software standby state 9, the interface is also not transferring data, just as in the first software standby state 5. However, the interface is in the CCP mode. The interface may make a transition to the first software standby state 5 by a CCI signal 19 that configures the interface to switch to the CSI-2 mode. The interface may also make a transition to the hardware standby state 3 by an external shutdown signal 17. This also results in a switch to the CSI-2 mode. The interface may further make a transition to the second streaming state 11 by a CCI signal 27 indicating that the data transfer should be started. This may be the case for example when a controller controlling the interface and a camera module causes the camera module to take a picture. The image data from the camera module is then transferred to the interface which further transfers the data, for example to a baseband processor.

In the second streaming state 11 the interface is actively transferring information, for example to a baseband processor, according to the CCP protocol. On the physical protocol level, the CCP is compatible with the D-PHY physical layer protocol of the CSI-2 mode. Thus the transfer of information to the baseband processor may utilize the same physical signal lines as in the first streaming state 7. The interface may make a state transition to the hardware standby state 3 by an external shutdown signal 25. This also results in a switch to the CSI-2 mode. The interface may also make a transition to the second software standby state 5 by a CCI signal 27 indicating that the transfer of information comprising the image data to the baseband processor is complete.

The interface may also assume further states. These further states may for example comprise software standby and streaming states corresponding to further protocols other than CCP and CSI-2.

Figure 4:
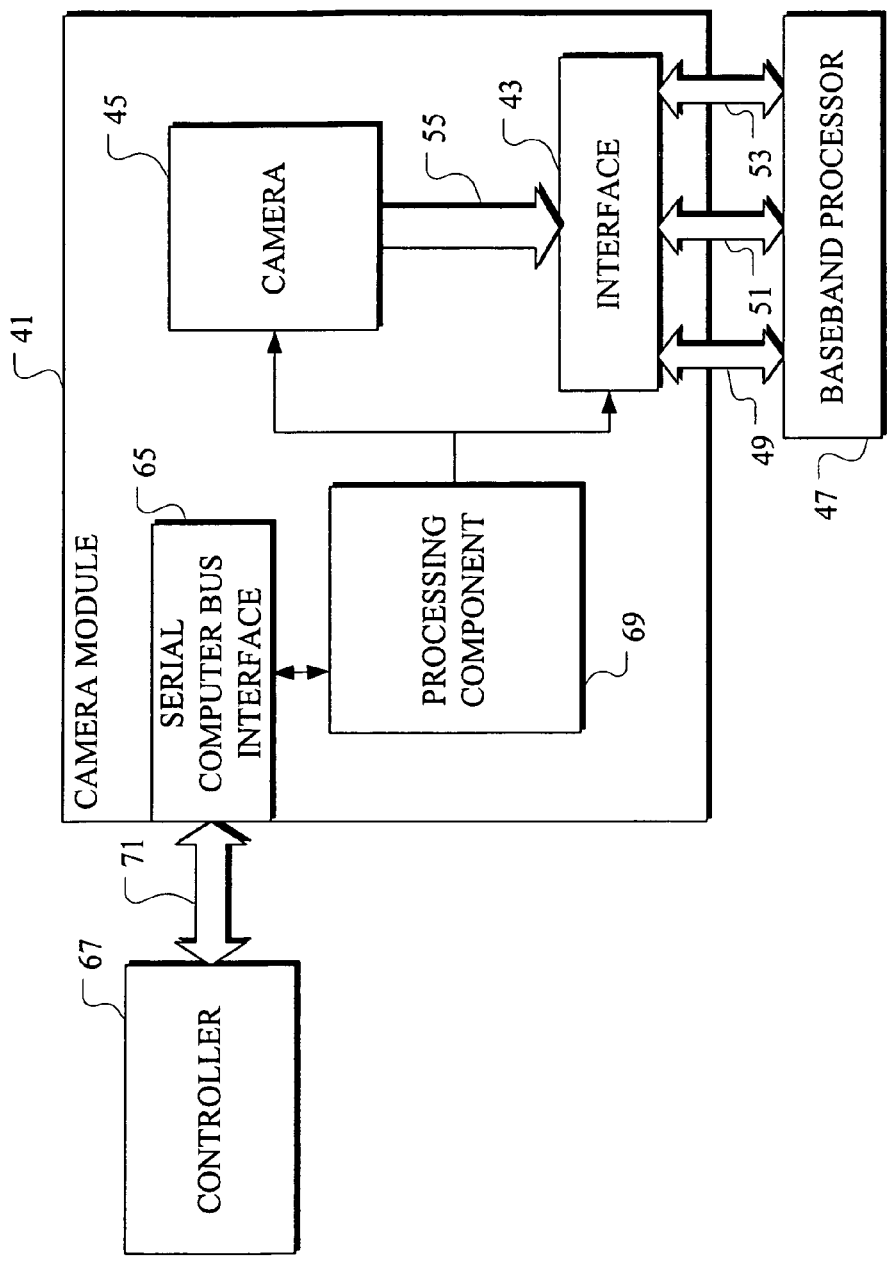
FIG. 4 is a schematic diagram illustrating a first exemplary embodiment of a camera module comprising an interface according to the present invention controlled by a controller and interfacing to a baseband processor.

FIG. 4 illustrates a first exemplary embodiment of a camera module 41 comprising an interface 43 according to the present invention. The camera module 41 as an exemplary apparatus further comprises a camera 45 as an exemplary detector, a processing component 69, a serial computer bus interface 65, and an image data bus 55. The serial computer bus interface 65, only by way of example a CCI bus interface 65, is connected to a controller 67 via CCI bus 71. The interface 43 is connected to a baseband processor 47 via three separate sets of physical signal lines 49, 51, 53, each of which serially transmits data words according to either the CSI-2 protocol or the CCP protocol. If the CSI-2 protocol is used, the data words may be transmitted via the physical signal lines 49, 51, 53 using the D-PHY physical layer protocol.

The processing component 69 controls the operation of the camera 45 by specifying the appropriate parameters of the camera. This includes when and in which manner image data is to be generated and in addition parameters like color, contrast, lighting, exposure time, data types, image size and resolution. The processing component 69 further controls transfer of the generated image data to the interface 43 via the image data bus 55. The processing component 69 implements the CCI protocol utilized by the CCI bus interface 65, as well as the CSI-2 protocol and the CCP protocol utilized by the interface 43.

In the CSI-2 mode, the interface 43 transfers the image data received from the camera 45 via the image data bus 55 to the baseband processor 47 via the sets of physical signal lines 49, 51, 53 according to the CSI-2 protocol when image data is received and when the image data transfer is activated by the processing component 69.

When no image data is received, interface 43 is not transferring data to the baseband processor 47.

The controller 67 may send a CCI signal via the CCI bus 71 to the CCI bus interface 65 of the camera module 41 requesting generating image data and transferring the image data to the baseband processor 47. The CCI signal is received by the CCI bus interface 65 and forwarded to the processing component 69. The processing component 69 causes the camera to capture an image and to transfer the image data via the image data bus 55 to the interface 43. The processing component 69 further controls the interface 43 to effect transfer of the image data received from the camera 45 via the image data bus 55 to the baseband processor 47 via the sets of physical signal lines 49, 51, 53 according to the CSI-2 protocol.

The controller 67 may then send a CCI signal via the CCI bus 71 to the CCI bus interface 65 of the camera module 41 requesting to stop transferring the image data to the baseband processor 47. The CCI signal is received by the CCI bus interface 65 and forwarded to the processing component 69. The processing component 69 causes the interface 43 to stop the transfer of the image data received from the camera 45 via the image data bus 55 to the baseband processor 47 via the sets of physical signal lines 49, 51, 53.

The controller 67 may further send a CCI signal via the CCI bus 71 to the CCI bus interface 65 of the camera module 41 requesting a switch to the CCP mode. This CCI signal is received by the CCI bus interface 65 and forwarded to the processing component 69. When the controller 67 next sends a CCI signal requesting transfer of image data generated by the camera 45, the processing component 69 causes the camera to capture an image and to transfer the image data via the image data bus 55 to the interface 43. The processing component 69 further controls the interface 43 to effect transfer of the image data received from the camera 45 via the image data bus 55 to the baseband processor 47 via the sets of physical signal lines 49, 51, 53 according to the CCP protocol.

It may be that in the CCP mode the image data that the interface 43 receives from the camera 45 is only transferred to the baseband processor 47 via the set of physical signal lines 49. The sets of physical signal lines 51, 53 are not involved in the transfer of data from the interface 43 to the baseband processor 47 in this situation.

The controller 67 may also send a CCI signal via the CCI bus 71 to the CCI bus interface 65 of the camera module 41 requesting a switch back to the CSI-2 mode. In this context see CCI signal 19 in FIG. 3 causing a transition from the first SW standby state 5 in the CSI-2 mode to the second SW standby state 9 in the CCP mode and alternatively causing a transition in the opposite direction. This CCI signal is also forwarded to the processing component 69 by the CCI bus interface 65. The next data transfer from the interface 43 to the baseband processor 47 thus occurs according to the CSI-2 protocol as described.

Figure 5:
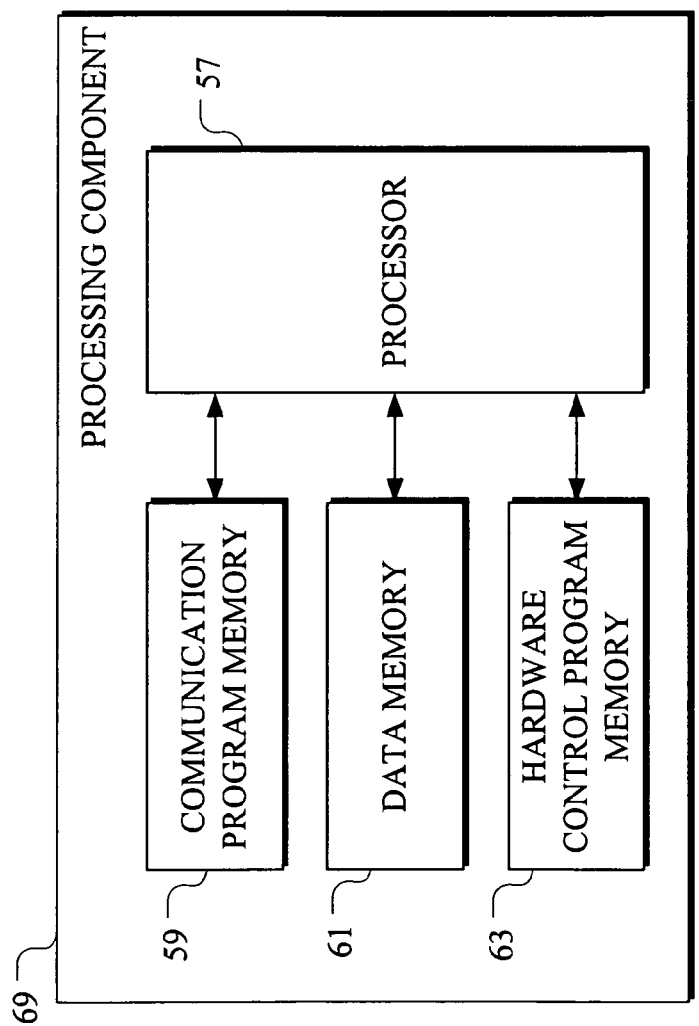
FIG. 5 is a schematic diagram illustrating an exemplary embodiment of a processing component comprised in the first exemplary embodiment according to the present invention.

FIG. 5 illustrates an exemplary embodiment of a processing component 69 comprised in the exemplary embodiment as described in reference to FIG. 4. The processing component 69 comprises a processor 57, communication program memory 59, data memory 61 and hardware control program memory 63. The software code stored in the hardware control program memory 63 is executed on the processor 57. Data generated at run time is stored in data memory 61. The software code stored in the hardware control program memory 63 implements the control of the operation of the camera 45 by specifying the appropriate parameters of the camera as described in reference to FIG. 4. The software code stored in the hardware control program memory 63 further implements the control of the transfer of the generated image data to the interface 43 via the image data bus 55 as described in reference to FIG. 4 when executed by the processor 57. The software code stored in the communication program memory 59 is also executed on the processor 57 and enables the implementation of the CCI protocol utilized by the CCI bus interface 65, as well as the CSI-2 protocol and the CCP protocol utilized by the interface 43 as described in reference to FIG. 4.

Figure 6:
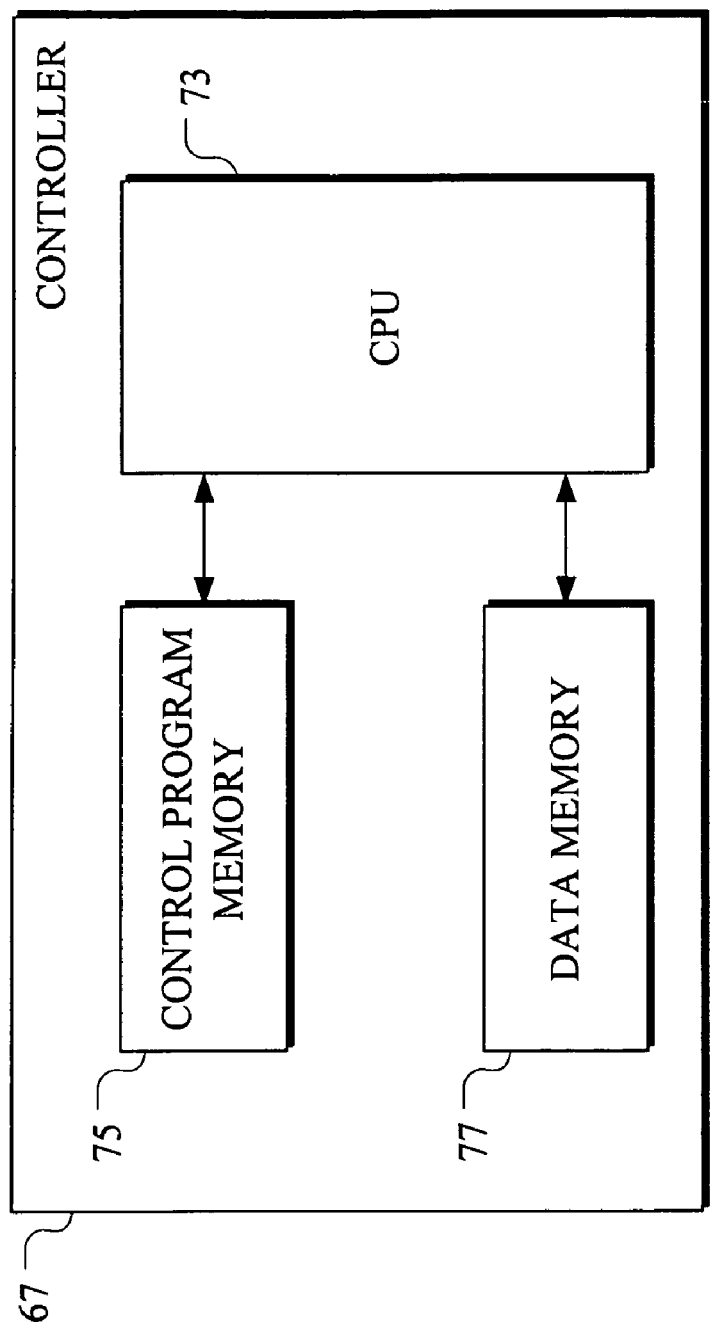
FIG. 6 is a schematic diagram illustrating an exemplary embodiment of a controller according to the second aspect of the present invention.

FIG. 6 illustrates an exemplary embodiment of a controller 67 comprised in the exemplary embodiment as described in reference to FIG. 4. The controller 67 comprises a central processing unit (CPU) 73, control program memory 75 and data memory 77. Software code implementing the functionality of the controller 67 is stored in control program memory 75 and executed in the CPU 73. Data generated at run time is stored in the data memory 77.

Figure 7:
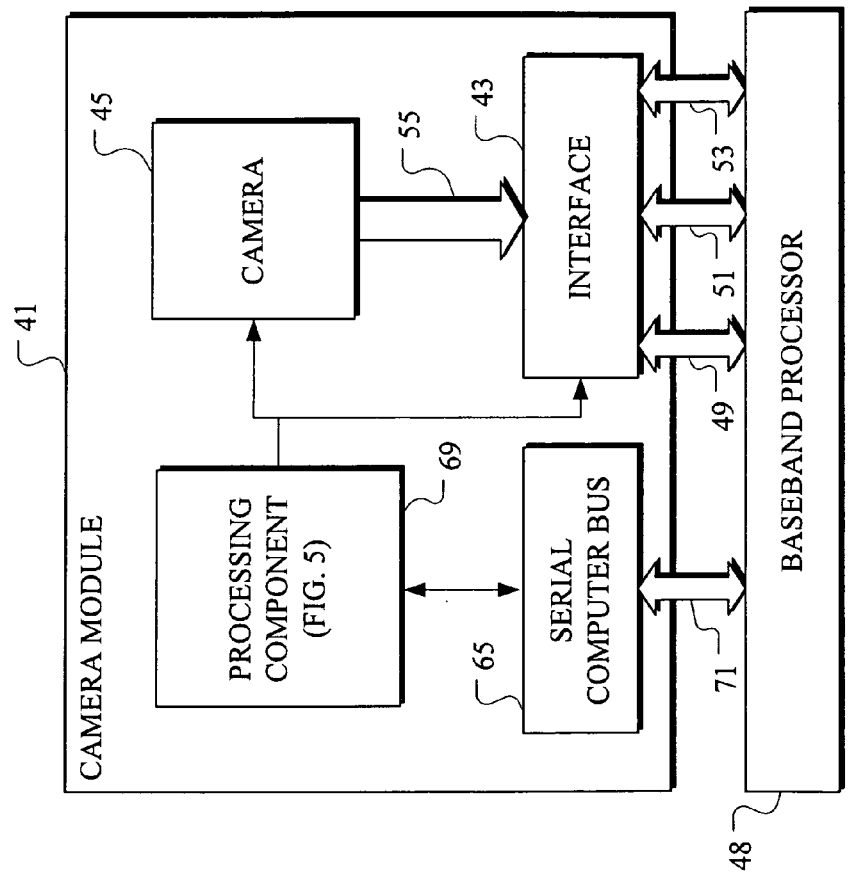
FIG. 7 is a schematic diagram illustrating the first exemplary embodiment of a camera module comprising an interface according to the present invention controlled by a baseband processor and interfacing to that baseband processor.

FIG. 7 illustrates the first exemplary embodiment of a camera module 41 comprising an interface 43 according to the present invention. The camera module 41 as an exemplary apparatus further comprises a camera 45, a processing component 69, a serial computer bus interface 65, and an image data bus 55. The processing component 69 has been described in detail in reference to FIG. 5. The processing component 69 comprises a processor 57 (see FIG. 5), communication program memory 59, data memory 61 and hardware control program memory 63. The serial computer bus interface 65, only by way of example a CCI bus interface 65, is connected to a baseband processor 48 via CCI bus 71. The interface 43 is also connected to the baseband processor 48 via three separate sets of physical signal lines 49, 51, 53, each of which serially transmits data words according to either the CSI-2 protocol or the CCP protocol. The physical layer of the sets of the physical signal lines 49, 51, 53 is compatible to the D-PHY physical layer protocol.

The software code stored in the hardware control program memory 63 (see FIG. 5) is executed on the processor 57. Data generated at run time is stored in data memory 61. The software code controls the operation of the camera 45 by specifying the appropriate parameters of the camera. This includes when and in which manner image data is to be generated and in addition parameters like color, contrast, lighting and resolution. The software code stored in the hardware control program memory 63 (see FIG. 5) further controls transfer of the generated image data to the interface 43 via the image data bus 55 when executed by the processor 57. The software code stored in the communication program memory 59 is also executed on the processor 57 and implements the CCI protocol utilized by the CCI bus interface 65, as well as the CSI-2 protocol and the CCP protocol utilized by the interface 43.

In the CSI-2 mode, the interface 43 transfers the image data received from the camera 45 via the image data bus 55 to the baseband processor 48 via the sets of physical signal lines 49, 51, 53 according to the CSI-2 protocol when image data is received and when the image data transfer is activated by the processing component 69. When no image data is received, interface 43 is not transferring data to the baseband processor 48.

The baseband processor 48 may send a CCI signal via the CCI bus 71 to the CCI bus interface 65 of the camera module 41 requesting generating image data and transferring the image data to the baseband processor 48. The CCI signal is received by the CCI bus interface 65 and forwarded to the processing component 69. The processing component 69 causes the camera to capture an image and to transfer the image data via the image data bus 55 to the interface 43. The processing component 69 further controls the interface 43 to effect transfer of the image data received from the camera 45 via the image data bus 55 to the baseband processor 48 via the sets of physical signal lines 49, 51, 53 according to the CSI-2 protocol.

The baseband processor 48 may then send a CCI signal via the CCI bus 71 to the CCI bus interface 65 of the camera module 41 requesting to stop transferring the image data to the baseband processor 48. The CCI signal is received by the CCI bus interface 65 and forwarded to the processing component 69. The processing component 69 causes the interface 43 to stop the transfer of the image data received from the camera 45 via the image data bus 55 to the baseband processor 48 via the sets of physical signal lines 49, 51, 53.

The baseband processor 48 may further send a CCI signal via the CCI bus 71 to the CCI bus interface 65 of the camera module 41 requesting a switch to the CCP mode. This CCI signal is received by the CCI bus interface 65 and forwarded to the processing component 69. When the baseband processor 48 next sends a CCI signal requesting transfer of image data generated by the camera 45, the processing component 69 causes the camera to capture an image and to transfer the image data via the image data bus 55 to the interface 43. The processing component 69 further controls the interface 43 to effect transfer of the image data received from the camera 45 via the image data bus 55 to the baseband processor 48 via the sets of physical signal lines 49, 51, 53 according to the CCP protocol.

It may be that in the CCP mode the image data that the interface 43 receives from the camera 45 is only transferred to the baseband processor 48 via the set of physical signal lines 49. The sets of physical signal lines 51, 53 are not involved in the transfer of data from the interface 43 to the baseband processor 48 in this situation.

The baseband processor 48 may also send a CCI signal via the CCI bus 71 to the CCI bus interface 65 of the camera module 41 requesting a switch back to the CSI-2 mode. In this context see CCI signal 19 in FIG. 3 causing a transition from the first SW standby state 5 in the CSI-2 mode to the second SW standby state 9 in the CCP mode and alternatively causing a transition in the opposite direction. This CCI signal is also forwarded to the processing component 69 by the CCI bus interface 65. The next data transfer from the interface 43 to the baseband processor 47 thus occurs according to the CSI-2 protocol as described.

Figure 8:
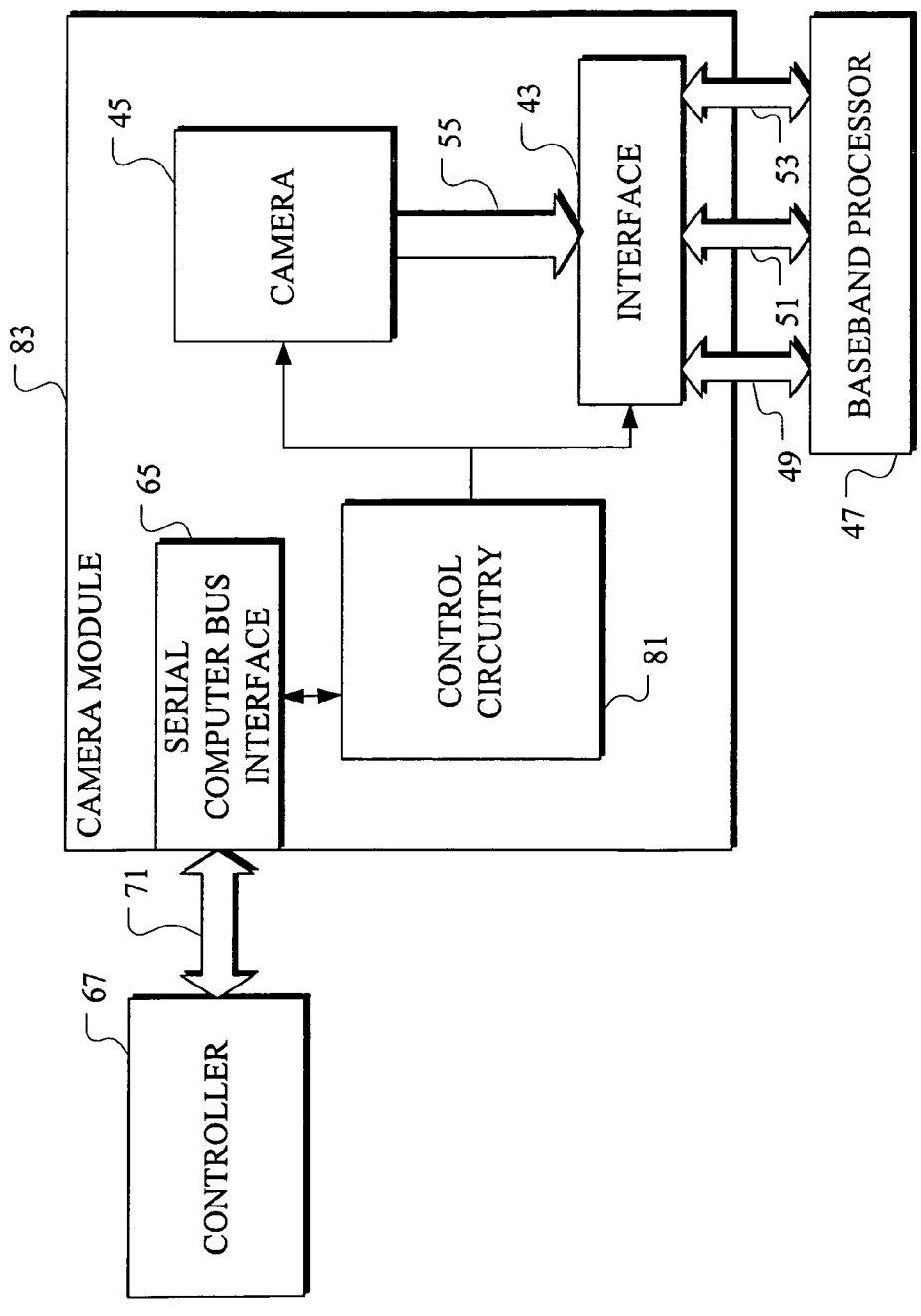
FIG. 8 is a schematic diagram illustrating a second exemplary embodiment of a camera module comprising an interface according to the present invention.

FIG. 8 illustrates a second exemplary embodiment of a camera module 83 comprising an interface 43 according to the present invention. The camera module 83 as an exemplary apparatus further comprises a camera 45, control circuitry 81, a serial computer bus interface 65, and an image data bus 55. The CCI bus interface 65 is connected to a controller 67 via CCI bus 71. The interface 43 is connected to a baseband processor 47 via three separate sets of physical signal lines 49, 51, 53, each of which serially transmits data words according to either the CSI-2 protocol or the CCP protocol. The physical layer of the sets of the physical signal lines 49, 51, 53 is compatible to the D-PHY physical layer protocol. The controller 67 has been described in detail in reference to FIG. 6. The controller 67 comprises a central processing unit (CPU) 73 (see FIG. 6), control program memory 75 and data memory 77. Software code implementing the functionality of the controller 67 is stored in control program memory 75 and executed in the CPU 73. Data generated at run time is stored in the data memory 77.

The control circuitry 81 controls the operation of the camera 45 by specifying the appropriate parameters of the camera. This includes when and in which manner image data is to be generated and in addition parameters like color, contrast, lighting and resolution. The control circuitry 81 further controls transfer of the generated image data to the interface 43 via the image data bus 55 when executed by the processor 57. The control circuitry 81 also implements the CCI protocol utilized by the CCI bus interface 65, as well as the CSI-2 protocol and the CCP protocol utilized by the interface 43.

In the CSI-2 mode, the interface 43 transfers the image data received from the camera 45 via the image data bus 55 to the baseband processor 47 via the sets of physical signal lines 49, 51, 53 according to the CSI-2 protocol when image data is received and when the image data transfer is activated by the control circuitry 81. When no image data is received, interface 43 is not transferring data to the baseband processor 47.

The controller 67 may send a CCI signal via the CCI bus 71 to the CCI bus interface 65 of the camera module 83 requesting generating image data and transferring the image data to the baseband processor 47. The CCI signal is received by the CCI bus interface 65 and forwarded to the control circuitry 81. The control circuitry 81 causes the camera to capture an image and to transfer the image data via the image data bus 55 to the interface 43. The control circuitry 81 further controls the interface 43 to effect transfer of the image data received from the camera 45 via the image data bus 55 to the baseband processor 47 via the sets of physical signal lines 49, 51, 53 according to the CSI-2 protocol.

The controller 67 may then send a CCI signal via the CCI bus 71 to the CCI bus interface 65 of the camera module 83 requesting to stop transferring the image data to the baseband processor 47. The CCI signal is received by the CCI bus interface 65 and forwarded to the control circuitry 81. The control circuitry 81 causes the interface 43 to stop the transfer of the image data received from the camera 45 via the image data bus 55 to the baseband processor 47 via the sets of physical signal lines 49, 51, 53.

The controller 67 may further send a CCI signal via the CCI bus 71 to the CCI bus interface 65 of the camera module 83 requesting a switch to the CCP mode. This CCI signal is received by the CCI bus interface 65 and forwarded to the control circuitry 81. When the controller 67 next sends a CCI signal requesting transfer of image data generated by the camera 45, the control circuitry 81 causes the camera to capture an image and to transfer the image data via the image data bus 55 to the interface 43. The control circuitry 81 further controls the interface 43 to effect transfer of the image data received from the camera 45 via the image data bus 55 to the baseband processor 47 via the sets of physical signal lines 49, 51, 53 according to the CCP protocol.

It may be that in the CCP mode the image data that the interface 43 receives from the camera 45 is only transferred to the baseband processor 47 via the set of physical signal lines 49. The sets of physical signal lines 51, 53 are not involved in the transfer of data from the interface 43 to the baseband processor 47 in this situation.

The controller 67 may also send a CCI signal via the CCI bus 71 to the CCI bus interface 65 of the camera module 83 requesting a switch back to the CSI-2 mode. In this context see CCI signal 19 in FIG. 2 causing a transition from the first SW standby state 5 in the CSI-2 mode to the second SW standby state 9 in the CCP mode and alternatively causing a transition in the opposite direction. This CCI signal is also forwarded to the control circuitry 81 by the CCI bus interface 65. The next data transfer from the interface 43 to the baseband processor 47 thus occurs according to the CSI-2 protocol as described.

Figure 9:
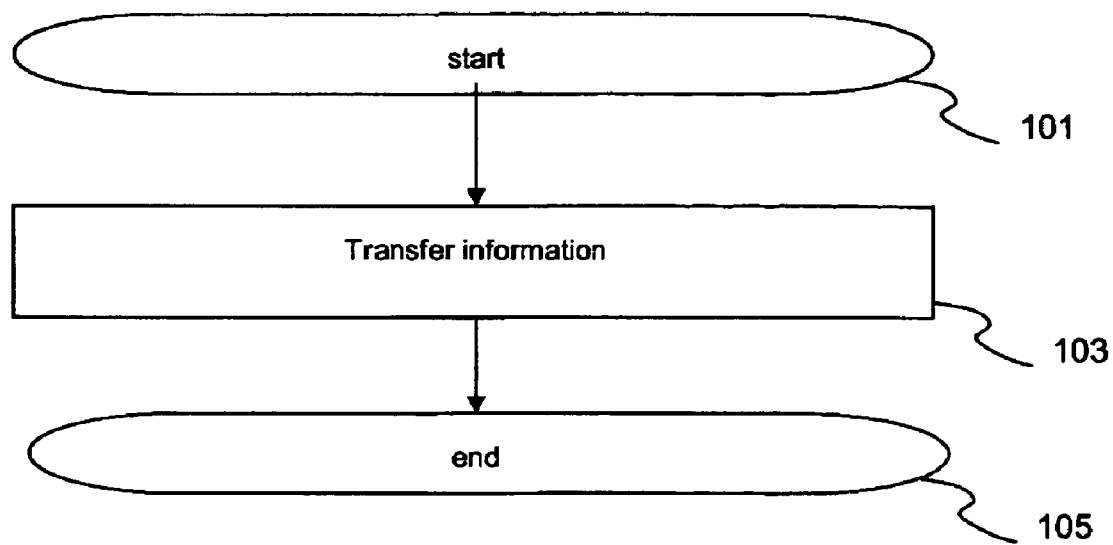
FIG. 9 is a flow chart illustrating exemplary method steps according to the first aspect of the present invention.

FIG. 9 illustrates an example of a method followed by processing component 69 (see FIG. 5) according to the teaching of the first aspect of the present invention. This method step may be implemented in a software program code stored in hardware control program memory 63 (see FIG. 5) and executed by the processor 57.

The start step 101 is entered when the interface 43 is in a first streaming state 7 (see FIG. 3). It is then proceeded to the second step 103.

In the second step 103 the processing component 69 causes a transfer of the image data from the camera 45 via the image data bus 55 to the interface 43 and further via the sets of physical signal lines 49, 51, 53 according to the CCP protocol or according to the CSI-2 protocol to the baseband processor 47. It is then proceeded to the end step 105.

Figure 10:
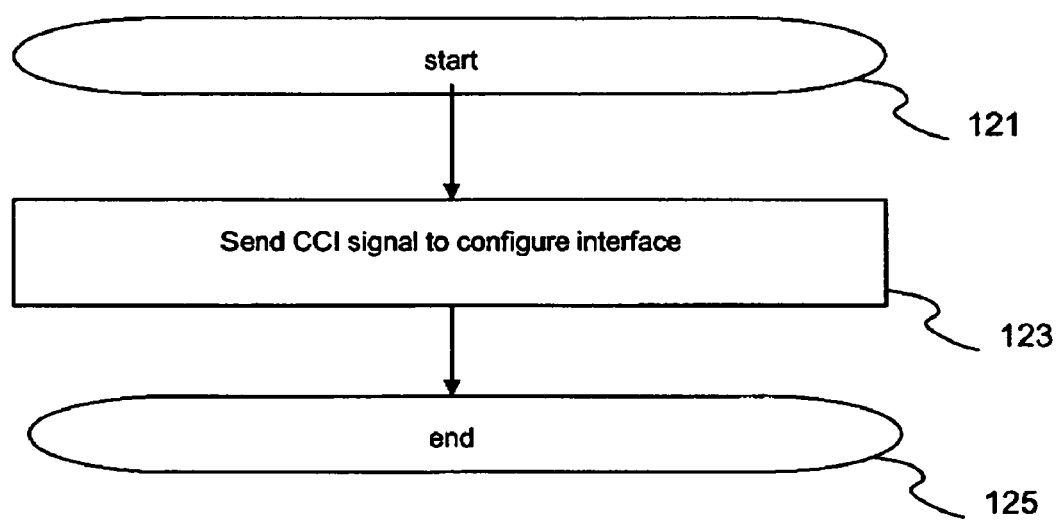
FIG. 10 is a flow chart illustrating an exemplary method step according to the second aspect of the present invention.

FIG. 10 illustrates an example of the procedural sequence followed by controller 67 (see FIG. 6) according to the teaching of the second aspect of the present invention. These procedural steps may be implemented in a software program code stored in control program memory 75 and executed by the CPU 73.

The start step 121 is entered when the interface 43 is in a first software standby state 5 (see FIG. 3) or in a second software standby state 9. The hardware has been started up and a startup signal 13 received. The CCI bus interface 65 (see FIG. 4) is ready for receiving CCI signals.

It is proceeded to the second step 123 in which the controller 67 sends a CCI signal via the CCI bus 71 to the CCI bus interface 65 of the camera module 41. Thus the interface 43 of the camera module 41 switches from a first software standby state 5 in the CSI-2 mode to a second software standby state 9 in the CCP mode. Alternatively, the interface 43 of the camera module 41 switches from a second software standby state 9 in the CCP mode to a first software standby state 5 in the CSI-2 mode. It is then proceeded to the end step 125.

It is readily clear for a person skilled in the art that the logical blocks in the schematic block diagrams as well as the flowchart and algorithm steps presented in the above description may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software.

The presented logical blocks, flowchart steps and algorithm steps may for instance be implemented in one or more digital signal processors (DSPs), application specific integrated circuits (ASICs), field programmable gate arrays (FPGAS) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims.

What is claimed is:

1. An apparatus comprising
at least one processor; and
at least one memory including computer program code, the at least one memory and the computer program code configured to, with the at least one processor, cause the apparatus at least to
electronically configure an electronically configurable physical interface of said apparatus to transfer image information from a camera of said apparatus according to a selected protocol of a pre-defined set of at least two protocols, so as to enable the transfer of the image information to an image processor of said apparatus that is only operable using said selected protocol and selected from among other processors only operable using another protocol of said pre-defined set of at least two protocols, and processing of the image information for display by a display of said apparatus.

2. Apparatus according to claim 1, wherein the at least two protocols of the pre-defined set of at least two protocols are serial protocols.

3. Apparatus according to claim 1, wherein the camera comprises the physical interface electronically configurable via a serial computer bus.

4. Apparatus according to claim 1, wherein the camera comprises the physical interface electronically configurable via a camera control interface.

5. Apparatus according to claim 1, wherein the at least two protocols are configured to have a mutually interoperable underlying physical layer protocol.

6. Apparatus according to claim 1, wherein the at least two protocols are configured to at least partially use the same physical signal lines.

7. Apparatus according to claim 6, wherein a physical layer of at least one of the at least two protocols comprises physical differential signal lines configurable to comprise a selected number of physical differential signal lines wherein said selected number comprises at least two different numbers.

8. Apparatus according to claim 1, wherein the at least two protocols are configured to use a different number of physical signal lines of the physical interface or to use different image information transfer speed on the physical interface, or both.

9. Apparatus according to claim 1, wherein the physical interface is operable in at least two states comprising a software standby state.

10. Apparatus according to claim 9, wherein the physical interface is electronically configurable while the interface is in a software standby state.

11. Apparatus according to claim 9, wherein the physical interface is operable in at least four states comprising a power off state, a hardware standby state, a software standby state and an active state.

12. Apparatus according to claim 1, wherein the physical interface is configurable by the same entity to which or from which the image information is transferred.

13. Apparatus according to claim 1, wherein the camera comprises an image detector configured to generate the image information.

14. Apparatus according to claim 13, wherein the image detector comprises said physical interface.

15. Apparatus according to claim 1, wherein said apparatus is a camera module comprising said physical interface.

16. Apparatus according to claim 1, wherein said image processor performs baseband processing of the image information.

17. Camera module comprising
a camera configured to generate image information;
at least one processor; and
at least one memory including computer program code configured to, with the processor, cause the camera module at least to electronically configure a physical interface of the camera module for installation and connection to physical lines of a portable device,
wherein the physical interface is electronically configurable to transfer the image information from the camera module over the physical lines of the portable device according to a selected protocol for further processing by a selected image processor installed in said portable device and only operable using the selected protocol for display on a display of said portable device, said selected image processor selected from among at least one other image processor that uses another protocol, said physical interface also electronically configurable for connection to the at least one other image processor only operable using the other protocol instead of said selected protocol so that said camera module is configurable for use with at least said selected image processor or said other image processor in said portable device.

18. Method comprising configuring an electronically configurable physical interface of a camera module in a portable device according to a selected protocol of a pre-defined set of at least two protocols so that image information is transferable from the camera module via the physical interface to an entity in the portable device interfaced over physical signal lines of the portable device to the camera module, the entity only operable using the selected protocol for processing the image information for display.

19. Method according to claim 18, wherein the at least two protocols of the pre-defined set of at least two protocols are serial protocols.

20. Method according to claim 18, wherein the physical interface is electronically configurable via a serial computer bus.

21. Method according to claim 20, wherein the physical interface is electronically configurable via a camera control interface.

22. Method according to claim 18, wherein the at least two protocols are configured to have a mutually interoperable underlying physical layer protocol.

23. Method according to claim 18, wherein the at least two protocols are configured to at least partially use the physical signal lines.

24. Method according to claim 23, wherein at least one of the at least two protocols comprises physical differential signal lines configurable to comprise a selected number of physical differential signal lines wherein said selected number comprises at least two different numbers.

25. Method according to claim 18, wherein the at least two protocols are scalable protocols configured to use a different number of the physical signal lines of the physical interface or to use a different image information transfer speed on the physical interface, or both.

26. Method according to claim 18, wherein the physical interface is operable in at least two states comprising a software standby state.

27. Method according to claim 26, wherein the physical interface is electronically configurable while the interface is in a software standby state.

28. Method according to claim 26, wherein the physical interface is operable in at least four states comprising a power off state, a hardware standby state, a software standby state and an active state.

29. Method according to claim 18, wherein the physical interface is configurable by the entity interfaced to the camera module.

30. Method according to claim 18, wherein the image information is generated by a detector of the camera.

31. Method according to claim 30, wherein the entity is configured to perform baseband processing of the image information.

32. Method according to claim 18, wherein the method is performed by the camera module in a portable device that comprises a user interface.

33. A nontransitory computer readable storage medium encoded with instructions that, when executed by a processor, perform the method according to claim 18.

34. An apparatus comprising:
means for enabling a physical interface of a camera module in the apparatus to be electronically configured to transfer image information according to a selected protocol of a pre-defined set of at least two protocols; and
means for transferring the image information from the camera module via the physical interface according to the selected protocol to an entity in the apparatus interfaced to the camera module and only operable using the selected protocol for processing the transferred image information for display by the apparatus, said entity selected from among at least one other entity that uses another protocol, said physical interface also electronically configurable for transfer of image information using the other protocol so that said camera module is useable at least with either said selected entity or with said at least one other entity in said apparatus.

35. Apparatus comprising a controller including a processor and at least one memory including control program code configured to, with the processor, cause the apparatus at least to electronically configure a physical interface in the apparatus to transfer image information according to a selected protocol of a pre-defined set of at least two protocols from a camera in the apparatus to an entity in the apparatus only operable using the selected protocol for processing the transferred image information for display by the apparatus, said entity selected from among at least one other entity that uses another protocol, said physical interface also electronically configurable for transfer of image information using the other protocol so that said camera module is useable at least either with said selected entity or with said at least one other entity in said apparatus.

36. A method comprising electronically configuring a physical interface in an apparatus to transfer image information according to a selected protocol of a pre-defined set of at least two protocols from a camera in the apparatus to an entity in the apparatus only operable using the selected protocol for processing the transferred image information for display by the apparatus, said entity selected from among at least one other entity that uses another protocol, said physical interface also electronically configurable for transfer of image information using the other protocol so that said camera module is useable at least either with said selected entity or with said at least one other entity in said apparatus.

37. A non-transitory computer readable storage medium encoded with instructions that, when executed by a processor, perform the method of claim 36.

38. An apparatus comprising:
 means for communicating with a physical interface via a physical connection in the apparatus; and
 means for electronically configuring the physical interface via the physical connection to transfer image information according to a selected protocol of a pre-defined set of at least two protocols to an entity in the apparatus connected to the physical interface to receive the image information and only operable according to the selected protocol to process the transferred image information for display by the apparatus by the apparatus, said entity selected from among at least one other entity that uses another protocol, said physical interface also electronically configurable for transfer of image information using the other protocol so that said camera module is useable at least with either said selected entity or with said at least one other entity in said apparatus.

* * * * *